United States Patent [19]

Corbett

[11] Patent Number: 4,702,400
[45] Date of Patent: Oct. 27, 1987

[54] AEROSOL DISPENSING METERING VALVE

[75] Inventor: John S. Corbett, Horsham, England

[73] Assignee: Fisons plc, Ipswich, England

[21] Appl. No.: 672,401

[22] Filed: Nov. 16, 1984

[30] Foreign Application Priority Data

Nov. 18, 1983 [GB] United Kingdom ............... 8330851

[51] Int. Cl.⁴ ............................................. B65D 83/06
[52] U.S. Cl. .............................. 222/402.2; 137/627.5
[58] Field of Search ............. 222/402.1, 402.2, 402.24; 137/627.5

[56] References Cited

U.S. PATENT DOCUMENTS

| 3,211,346 | 10/1965 | Meshberg | 222/402.2 X |
| 3,394,851 | 7/1968 | Gorman | 222/402.2 |
| 3,464,596 | 9/1969 | Meshberg | 222/402.2 |
| 4,413,755 | 11/1983 | Brunet | 222/402.2 |
| 4,427,137 | 1/1984 | Dubini | 222/402.2 |

FOREIGN PATENT DOCUMENTS

| 45419 | 10/1984 | European Pat. Off. |
| 2147177 | 3/1973 | France |
| 1201918 | 8/1970 | United Kingdom |
| 1270272 | 4/1972 | United Kingdom |
| 2004526 | 4/1979 | United Kingdom |

Primary Examiner—Joseph J. Rolla
Assistant Examiner—Michael S. Huppert
Attorney, Agent, or Firm—Marshall, O'Toole, Gerstein, Murray & Bicknell

[57] ABSTRACT

There is described an improved aerosol dispensing metering valve. The valve, for use with a container for pressurized material comprises a valve body with a single internal metering chamber and outer and inner seals closing the respective outer and inner ends thereof. A valve member co-operating with the seals is movable between an inoperative position, in which the chamber is isolated from the atmosphere while the chamber communicates with the interior of the container, and an operative position in which the contents of the chamber can be discharged to the atmosphere while the chamber is isolated from the interior of the container. The valve member is provided with a lower portion adapted to slidably engage the inner seal when the valve is in the inoperative position, the lower portion being provided with means for communicating between the metering chamber and the interior of the container, the means being of sufficient size to allow the exit of air trapped in the chamber and to permit the entry of pressurized material in to the chamber when the valve is in the inoperative position.

13 Claims, 2 Drawing Figures

AEROSOL DISPENSING METERING VALVE

This invention relates to an improved aerosol dispensing metering valve and in particular to a valve for dispensing pressurised powder aerosols.

Valves for dispensing known, metered amounts of pressurised aerosol, for use with a pressurised aerosol container are well known. Conventionally, the valves comprise a valve body with an internal metering chamber, an outer and inner seal closing the outer and inner ends of the chamber, a valve member movable between an inoperative position in which the metering chamber is isolated from atmosphere and an operative position in which the contents of the metering chamber are discharged to the atmosphere while the chamber is isolated from the interior of the container, and resilient means urging the valve member to its inoperative position.

The outer end of the chamber is closest to the atmosphere when in use, and the inner end of the chamber is adapted to be adjacent the interior of the container.

A large number of valves for use in the inverted position, that is with the opening of the pressurised aerosol container facing downwards, have been proposed. Many of these devices are claimed to discharge controlled quantities of material, without alteration of the discharged amount, until the container is empty. Valves provided for use with the container in the inverted position are described, for example, in the specifications of U.S. Pat. No. 3,394,851 and French patent No. 2147177.

The device of U.S. Pat. No. 3,394,851 is for use with a compressed gas aerosol and includes a two compartment metering chamber which does not function satisfactorily with pressurised powder aerosols, in which the powder is suspended in pressurised propellant.

French patent No. 2147177 describes a valve which comprises a metering chamber, closed at the inner and outer ends with inner and outer seals respectively and a valve stem extending through the metering chamber. In the operative position the metering chamber communicates with the interior of an attached container by means of a groove on the lower portion of the valve stem which is in register with a corresponding groove in the valve body.

Although valves such as these have proved very satisfactory with manually operated pressurised aerosol dispensers, we have found that they tend to be unsatisfactory with automatic or breath actuated devices.

Breath actuated aerosol dispensers, such as that disclosed in European patent No. 45419B, are actuated automatically by inhalation. When the contents of the metering chamber are discharged, the valve stem is held in a depressed position until the dispenser is recocked by the user. Typically, the device is only recocked immediately prior to use. Consequently, in contrast to manually actuated valves, in which the metering chamber is in communication with the interior of the container while the dispenser is not in use, in breath actuated devices, the metering chamber is isolated from the interior of the container and communicates, instead, with the atmosphere.

We have now found that holding the valve member depressed for even a short period of time allows air to diffuse into the metering chamber, from the atmosphere. Return of the valve member to the inoperative position traps air in the metering chamber. This appears to cause air locks and/or bubbles which prevent the chamber from completely filling with the contents of the container. Consequently on subsequent actuation of the valve a reduced amount of pressurised aerosol is dispersed.

This problem does not appear to have been previously identified.

Valves have been proposed, for example UK patent application No. 2004526A and European patent application No. 0061973A, in which the lower portion of the valve member is constricted and the diameter of the orifice in the inner seal is substantially larger than that of the valve member. In the specification of UK No. 2004526A it is stated that the relative dimensions of the seal and the stem are such that in the inoperative position the annular space between the valve is of sufficient size not to significantly impede the flow of material into or out of the metering chamber. However, the valve disclosed in UK No. 2004526A suffers from that disadvantage that it has a one piece valve stem that is very difficult to manufacture to a consistent standard and tends to fracture easily in use.

The valve disclosed in EPA No. 0061973A suffers from the disadvantage that it has a two piece valve stem which requires two mouldings and an additional assembly step, which greatly increases manufacturing costs.

We have now found a metering valve which overcomes the problems of air locks, consistently delivers a metered dose when used in association with the breath actuated device of EP No. 45419B and substantially mitigates the disadvantages associated with constricted valve stems.

According to the invention we provide an aerosol dispensing metering valve for use with a container for pressurised material, the valve comprising a valve body with a single internal metering chamber, outer and inner seals closing the respective outer and inner ends thereof, a valve member co-operating with the seals and movable between an inoperative position in which the chamber is isolated from the atmosphere while the chamber communicates with the interior of the container, and an operative position in which the contents of the chamber can be discharged to the atmosphere while the chamber is isolated from the interior of the container, the valve member being provided with a lower portion adapted to slidably engage the inner seal when the valve is in the inoperative position, the lower portion being provided with means for communicating between the metering chamber and the interior of the container, the means being of sufficient size to allow the exit of air trapped in the chamber and to permit the entry of pressurised material into the chamber when the valve is in the inoperative position.

The means for communicating between the metering chamber and the interior of the container may be, for example, a slot which spans opposing faces of the lower portion of the member. However, we prefer the means to comprise at least two channels on the valve member. We prefer the means to comprise up to and including eight channels. We particularly prefer the means to comprise from three to six channels inclusive, especially four.

The metering chamber is preferably provided with an apertured base, adapted to surround but not contact the lower portion of the valve member. The aperture may be for example, square, triangular or castellated. However, we prefer the valve member to be circular in cross-section and the aperture to be circular and of greater diameter than the diameter of the valve member, such that there is an annular space surrounding the valve member, immediately above the inner seal.

We prefer the annular space, to be e.g. from about 0.1 mm to 2 mm, preferably 0.3 mm in width, measuring from the stem to the surface of the chamber defining the outer surface of the annulus. The means for communicating between the metering chamber and the interior of the container preferably terminates above the inner seal and within the aperture in the base, when the valve member is in the inoperative position.

When the means comprises channels, preferably at least two of the channels are sufficiently large not to become blocked by air bubbles or by the surface tension of pressurised liquid propellant in the chamber. For example, for a stem of circular cross-section, with a diameter of about 3.2 mm and four channels, the channels may each be from about 0.2 to 1.5 mm, preferably 0.3 to 1.2 mm, particularly 0.7 mm deep, and from about 0.2 to 2.0 mm, preferably 0.3 to 1.5 mm, particularly 0.8 mm wide.

The channels are preferably spaced about and parallel to the long axis of the valve member. The channels are preferably spaced angularly about the long axis, most preferably with equi-angular spacing.

The channels are preferably in the form of open grooves or furrows, with a partially circular cross-section.

The portion of the valve member which is not provided with the means for communicating is preferably of circular cross-section. However, we prefer the end portion of the valve member which remains in the interior of the container when the valve is in the inoperative position to be of smaller circular cross section than the remainder. We particularly prefer this end portion to be tapered.

When used in a conventional metering chamber with a capacity of from about 20 µl to 500 µl, with a valve member of generally circular cross section, the combined clearance between the space and at least one of the channels, that is the sum of the depth of the channel and the width of the space, is preferably at least 1.0 mm.

The valve is preferably provided with a resilient means urging the valve member to its inoperative position. The resilient means, e.g. a compression spring, may be mounted within the metering chamber. However, we prefer the resilient means to be a compression spring mounted external to the metering chamber, e.g. on the container side of the inner seal.

When the spring is mounted externally, we prefer the valve body to be provided with an extension in the form of ribs which define an open ended cylindrical tube enclosing the spring, the extension being adapted to guide the movement of the valve member from the inoperative to the operative position. We particularly prefer the movement of the valve member within the body extension to be further guided by an annular collar, surrounding the valve member and slidably mounted within the interior of the body extension. The collar preferably provides an upper seat for the compression spring.

The inwards movement of the valve member relative to the chamber is preferably limited by stop means within the chamber adapted to bear against a base member included in the chamber. The stop means preferably comprise a peripheral rib on a portion of the valve member that remains within the metering chamber during actuation. The base member preferably comprises the base portion of the metering chamber. Aerosol dispensing metering valves according to the invention are advantageous in that they are cheaper to manufacture, more robust or more reliable, particularly in association with the breath actuated dispenser of EP No. 45419B, than known valves of similar construction.

A preferred embodiment of the invention will now be described with reference to the accompanying drawings, in which.

Figure 1:
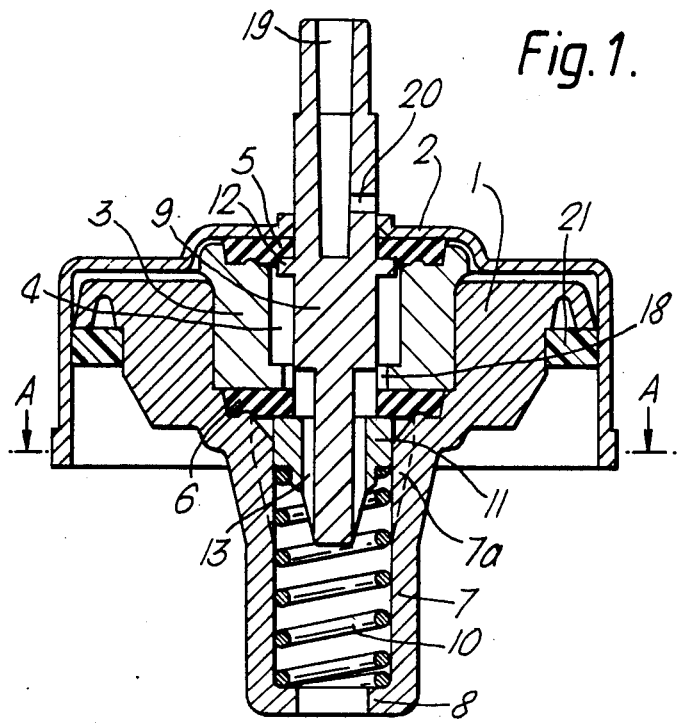
FIG. 1 is a vertical section through a metering valve according to the invention, showing the valve member in the inoperative position.

Referring first to FIG. 1, a valve according to the invention comprises a body in the form of a circular cup 1 fitted in a ferrule 2. A valve bush 3 provided with an appertured base fits in the cup 1 defining a metering chamber 4 which is fixed with respect to the cup 1. The metering chamber 4 is provided at the outer end, immediately adjacent to the ferrule 2 with an outer seal or gasket 5, and at the inner end with an inner seal or gasket 6. The inner end of the chamber 4 is adapted to fit within the interior of a pressurised aerosol container.

A hollow tubular guide 7 extends from the cup 1 beneath the chamber 4 and inner seal 6. The interior side walls of the guide 7 are provided with guide fins 7a, the fins 7a defining a cylindrical interior passage. The side walls of the guide 7 are additionally provided with diametrically opposed elongate apertures (not shown). The lower end portion of the guide 7 is provided with an inwardly facing peripheral flange 8.

A valve member in the form of a valve stem 9 of generally circular cross section extends through the chamber 4 and into the interior of the guide 7. The end portion of the valve stem extending into the guide 7 is surrounded by a compression spring 10, retained in the guide 7 by the flange 8, and bearing against an annular collar 11 mounted on the inner end portion of the valve stem 9. The collar 11 is slidably mounted within the guide 7.

The spring 10 urges the valve stem 9 towards the inoperative position shown in FIG. 1. The outwards movement of the valve stem 9 is limited by a peripheral rib 12 extending from the stem 9 within the metering chamber 4, which bears against the outer seal 5 when the valve is in the inoperative position. The rib 12 also limits the inwards movement of the valve stem 9 by bearing against the base of the bush 3 when the valve stem is in the operative position.

Figure 2:
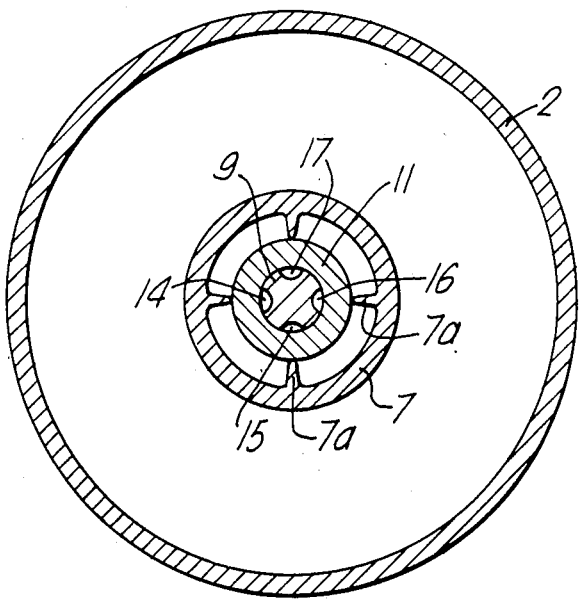
FIG. 2 is a horizontal section through the valve member along the lines A—A of FIG. 1.

The lower portion of the valve stem 9 is provided with means for communicating the chamber 4 with the interior in the form of a plurality of channels 13 when the valve stem 9 is in the inoperative position. As is shown in more detail in FIG. 2, the purality of channels 13 in the preferred embodiment comprises four grooves, 14, 15, 16 and 17 equi-angularly spaced about and parallel to the long axis of the valve stem 9. The grooves 14, 15, 16 and 17 run from the end of the valve stem 9 adapted to move within the interior of the container and are arranged such that when the stem 9 is in the inoperative position they terminate just above the inner seal 6, within the base of the bush 3. A small annular space, 18, e.g. of about 0.2 mm width, provided in the base of the bush 3 and surrounding the valve member 9, ensures that communication between the chamber 4 and the interior is established by the channels 13 when the valve stem 9 is in the inoperative position.

The lower part of the valve stem 9 is tapered, so that the channels 13 are less deep at the lower end than at the chamber end.

The outer end portion of the valve stem 9 is provided with an outlet passage 19 through which a charge can be dispensed from the metering chamber 4, such charge entering the outlet passage 19 through a transfer port 20. In the inoperative position, the transfer port lies outside the ferrule 2, and communicates with the chamber 4, on inward movement of the stem 9 to the operative position.

The stem 9 forms a sealing fit with the outer seal 5 in both the operative and inoperative positions, and a sealing fit with inner seal 6 only when the valve is in the operative position.

Thus in the inoperative position the chamber 4 is sealed from the outside (the atmosphere), but is adapted to communicate with the interior of the container, and in the operative position communicates with the outside, while being sealed from the interior.

In use, the valve is crimped on to a container for pressurised aerosol material, e.g. a medicament, the container bearing against the container gasket 21. In the inoperative position the pressurised material can readily move from the chamber 4 to the interior of the container, and vice versa, by means of the channels 13.

With the valve inverted, i.e. with the outer dispensing portion of the valve stem 9 pointing downwards, the chamber fills with pressurised liquid propellant. Actuation of the valve stem 9, against the bias of the spring 10, causes the port 20 to move into the chamber 4, allowing the pressurised material to be dispensed from the chamber 4 via the passage 19 to the outside.

Air that diffuses into the chamber 4, while the valve stem 9 is in the operative position is trapped in the chamber 4 on movement of the stem 9, urged by the spring 10 back to the inoperative position. The plurality of channels 13 and the annular space 18 allow the trapped air to flow out of the chamber, and pressurised material from the container to flow into the chamber.

I claim:

1. An aerosol dispensing metering valve for use in a breath-actuated device with a container for pressurised material, the valve comprising a valve body with a single internal metering chamber, the metering chamber having a base provided with an aperture, outer and inner seals closing the respective outer and inner ends of the metering chamber, a longitudinal valve member cooperating with the seals and movable within the aperture between an inoperative position in which the chamber is isolated from the atmosphere while the chamber communicates with the interior of the container, and an operative position in which the contents of the chamber can be discharged to the atmosphere while the chamber is isolated from the interior of the container, the valve member having a lower valve stem portion adapted to slidably engage the inner seal when the valve is in the inoperative position, and at least two channels extending longitudinally on the lower valve stem portion for communicating between the metering chamber and the interior of the container, the aperature being of such size that immediately above the inner seal there is an annular space of width 0.1 to 2 mm between the valve member and the walls of the aperture, and the channels being between 0.2 and 1.5 mm deep, such that the sum of the width of the annular space and the depth of the channels is at least 1 mm and the exit of air trapped in the metering chamber and the entry of pressurised material into the chamber is readily allowed when the valve is in the inoperative position.

2. A metering valve according to claim 1, wherein the valve is provided with from three to six channels inclusive.

3. A metering valve according to claim 1, wherein each of the channels terminates above the inner seal and within the aperture in the base, when the valve member is in the inoperative position.

4. A metering valve according to claim 3, wherein the valve is provided with resilient means urging the valve member to the inoperative position.

5. A metering valve according to claim 4, wherein resilient means are mounted externally to the metering chamber on the container side of the inner seal.

6. A metering valve according to claim 5, wherein the inwards movement of the valve member relative to the chamber is limited by stop means within the chamber adapted to bear against a base member included in the chamber.

7. A metering valve according to claim 6, wherein the stop means comprise a peripheral rib on a portion of the valve member that remains within the metering chamber during actuation.

8. A breath-actuated aerosol device including a container for pressurized material provided with a dispensing metering valve, the valve comprising a valve body with a single internal metering chamber, the metering chamber having a base provided with an aperture, outer and inner seals closing the respective outer and inner ends of the metering chamber, a valve member cooperating with the seals and movable within the aperture between an inoperative position in which the chamber is isolated from the atmosphere while the chamber communicates with the interior of the container, and an operative position in which the contents of the chamber can be discharged to the atmosphere while the chamber is isolated from the interior of the container, the valve member being provided with a lower valve stem portion adapted to slidably engage the inner seal when the valve is in the inoperative position, and at least two channels extending longitudinally on the lower valve stem portion for communicating between the metering chamber and the interior of the container, the aperture being of such size that immediately above the inner seal there is an annular space of width 0.1 to 2 mm between the valve member and the walls of the aperture, and the channels being between 0.2 and 1.5 mm deep, such that the sum of the width of the annular space and the depth of the channels is at least 1 mm and the exit air trapped in the metering chamber and the entry of pressurized material into the chamber is readily allowed when the valve is in the inoperative position.

9. A breath-actuated aerosol device according to claim 8, wherein the valve is provided with from three to six channels inclusive.

10. A breath-actuated aerosol device according to claim 8, wherein the valve is provided with resilient means urging the valve member to the inoperative position.

11. A breath-actuated aerosol device according to claim 10, including a valve wherein resilient means are mounted externally to the metering chamber on the container side of the inner seal.

12. A breath-actuated aerosol device according to claim 8, wherein the inwards movement of the valve member relative to the chamber is limited by stop means within the chamber adapted to bear against a base member included in the chamber.

13. A breath-actuated aerosol device according to claim 12, including a valve wherein the stop means comprise a peripheral rib on a portion of the valve member that remains within the metering chamber during actuation.

* * * * *